Sept. 9, 1969     A. W. GREENBERG     3,466,453

ELECTRICAL SYSTEM IMPROVEMENT FOR VEHICLES

Filed Jan. 25, 1968     2 Sheets-Sheet 1

INVENTOR.
ALLAN W. GREENBERG

BY John Cyril Malloy

ATTORNEY.

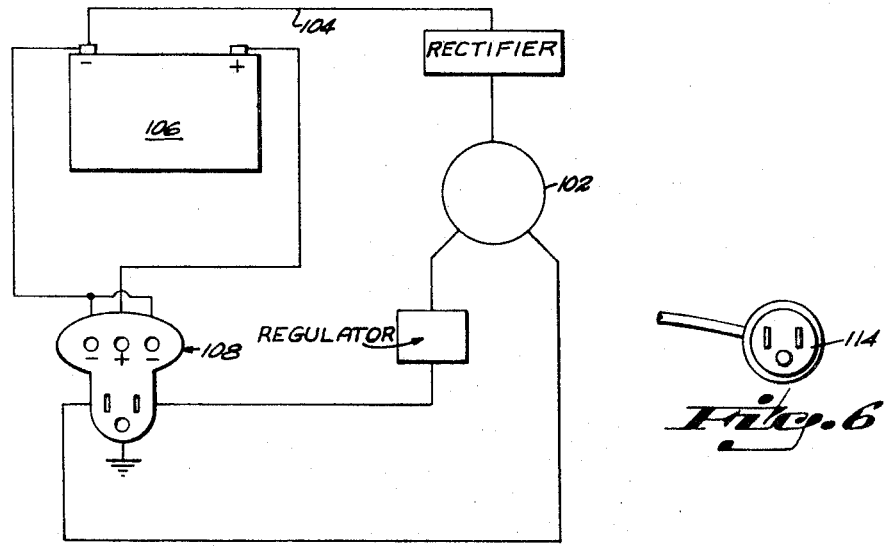
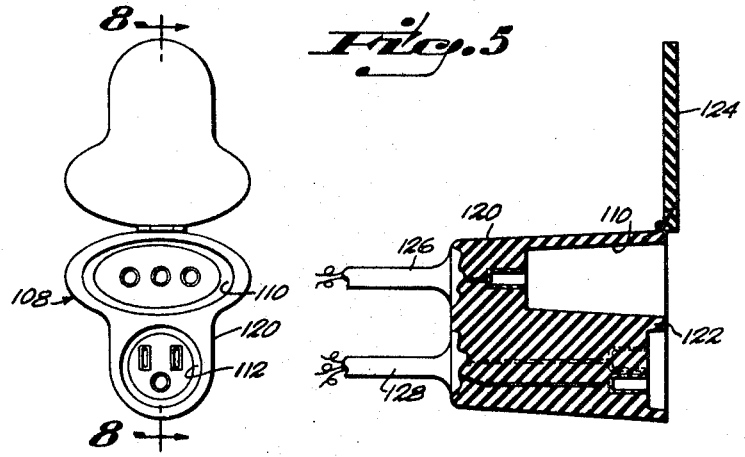

United States Patent Office 3,466,453
Patented Sept. 9, 1969

3,466,453
ELECTRICAL SYSTEM IMPROVEMENT FOR VEHICLES
Allan W. Greenberg, 917 Algaringo Ave., Coral Gables, Fla. 33134
Filed Jan. 25, 1968, Ser. No. 700,514
Int. Cl. H02j 7/14, 7/34
U.S. Cl. 307—10
8 Claims

ABSTRACT OF THE DISCLOSURE

An electrical system for use in starting an engine of a vehicle with a defective battery and interconnecting the same with a vehicle having a charged battery, which system includes a receptacle unit mounted on each vehicle and electrically connected to its associated battery and an electrical connector cable to connect the receptacle units of each vehicle to transmit power for starting the vehicle with a defective battery; and an improved receptacle for utilizing the power generated by an alternator of a vehicle to energize in A.C. type electrical appliance, said improved receptacle including a socket for receiving the male plug of an alternating current type electrical appliance.

---

This invention relates to the starting of an engine of a vehicle, and, more particularly, to an electrical system for interconnecting a vehicle having a defective battery and a vehicle having a charged battery, which electrical system includes the socket on each vehicle and an electrical connector member having a plug at each end for hooked up electrical engagement with the receptacles.

As is perhaps well known, motorists from time to time forget to turn off their lights or find themselves with a battery of insufficient charge to start their motor vehicle, irrespective of the reason for which the battery has become weakened. This is quite often an occasion of extreme inconvenience and is particularly distressing to women drivers who may find themselves parked in an area where there are other automobiles and drivers while at the same time professional help for starting a car is not available. This invention provides an electrical system which includes a receptacle on a vehicle having a defective battery which is adapted to receive the plug of a connector cord so that the automobile may be started by connecting it to a similar receptacle in another vehicle simply by inserting the plug of the cord into the receptacle of the other vehicle. It is, accordingly, an object of this invention to provide an electrical system adapted for use in starting an automobile with a defective battery from a charged battery of another similarly equipped vehicle and which system includes a receptacle connected to the battery of each vehicle and an electrical conductor cable, of the type which may be readily stored in the trunk of either or both vehicles, as on a reel, to interconnect the receptacle of each vehicle so that the vehicle having the defective battery may be started using the power of the vehicle having the charged battery.

It is another object of this invention to provide an improved receptacle unit and plug which are sized and configured for ease of use and which unit protectively houses the electrical leads in a convenient and accessible place for use in an emergency, which leads are arranged so as to respect the polarity of the automobile equipment and to shield from objectionable sparks and flashes.

Additionally, as is appreciated, the sport of camping has become quite popular as has boating. Quite often these activities, as well as numerous other activities such as farming and construction, entail or involve the use of electrical appliances, such as an electric saw for use by a camper. Additionally, a motorist in distress at a isolated loaction, for instance, may have need to utilize the power available from the engine to energize an electrical appliance, such as a search light, etc. However, because of the remote location, alternating current is not readily available for use to energize these appliances. The present invention includes a socket in the receptacle unit which is electrically connected to the alternator including suitable regulating equipment so as to deliver alternating current of the proper voltage fo ruse by the appliance. It will be seen that this structure provides for temporary electrical power during times when it is not available, such as following a flood or hurricane.

It is, therefore, a further object of this invention to provide an improved receptacle for use on a vehicle including a generator or alternator in electrical engagement therewith so that alternating current is adapted to be delivered to electrical appliances utilizing the vehicle power plant to drive the alternator.

In accordance with these and other objects which will become apparent hereinafter, the instant invention will now be described with reference to the accompanying drawings in which:

FIGURE 5 is an alternative embodiment illustrating a species of the instant invention;

FIGURE 6 is an end view of a terminal plug of a conventional electrical appliance;

FIGURE 7 is a view similar to FIGURE 3 and illustrating a terminal socket for the embodiment of FIGURE 1 and additional socket to deliver A.C. current; and FIGURE 8 is a view similar to FIGURE 4 and taken along the plane indicated by the line 8—8 of FIGURE 7 and looking in the direction of the arrows.

Figure 1:
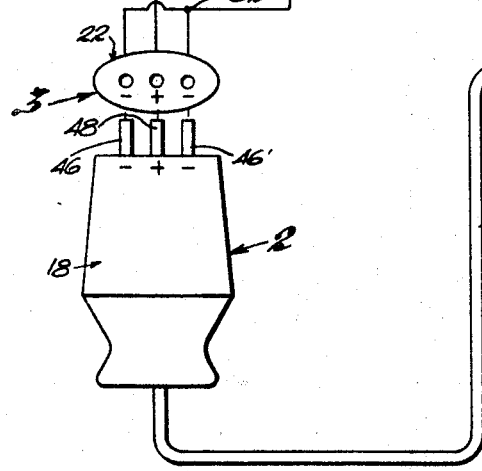
FIGURE 1 is a schematic diagram illustrating the instant invention.
Figure 1:
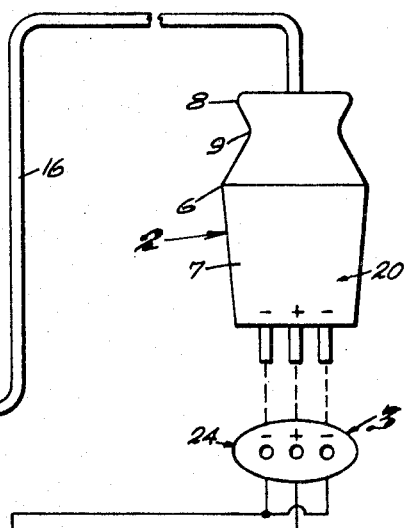

Referring to the drawings, wherein like reference characters designate like or corresponding parts throughout the different views, and referring particularly to FIGURE 1, there is shown a battery 12 and a battery 14 which are represented schematically to indicate installation upon a first and a second land vehicle. The numeral 16 indicates a connector cord having a plug such as that indicated by the numeral 18 or 20 at the opposite ends thereof. Each of the batteries are connected to a receptacle such as 22 or 24 which are mounted to the vehicle on which the respective battery is installed and which are preferably of the type indicated in FIGURES 3 and 4.

In operation, when a vehicle such as that indicated by the numeral 12 in FIGURE 1 has a battery with insufficient power to start the engine of vehicle A, the owner may, by using the electrical cord 16, connect the battery with the battery 14 of a vehicle such as that indicated by the letter B simply by connecting the plugs 18 and 20 respectively to the receptacle 22 on car A and receptacle 24 on car B, so that the energy available in the battery 14 may be employed to supplement the remaining power of the battery 12 to start the vehicle A.

Figure 3:
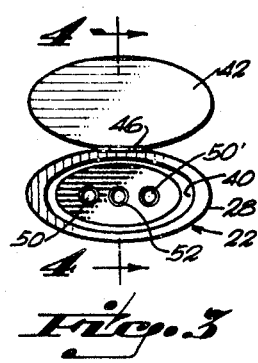
FIGURE 3 is an end view of the receptacle indicated by the arrowed line 3 in FIGURE 1.
Figure 4:
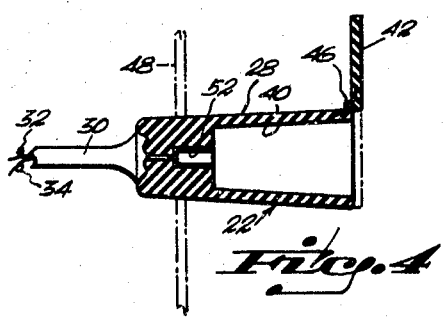
FIGURE 4 is a side elevational view of the receptacle seen in FIGURE 3 in cross section along 4—4.

FIGURES 3 and 4 illustrate a preferred construction for the terminal receptacle which, as seen, includes a housing 28 electrically connected as by the cable 30 having insulated conductor wires 32 and 34 electrically connected to the terminal posts 36 and 38 or 36' and 38' of a battery. The housing of the receptacle 22 is preferably provided with a recessed mouth 40 which is oval shape as seen in plan and with respect to which a normally closed, spring-biased access door 42 is provided which employs a hinge and spring means 46. The receptacle is suitably and unobtrusively mounted, as on the front grillwork indicated by the numeral 48 of an automobile or other convenient location. The terminal plugs 18 and 20 are each provided with a tapered, generally oval terminal end, companionately configured for insertion and nesting of the electrical prongs 46 and 46' comprising the negative leads, and 48 comprising the positive lead within the corresponding sockets 50, 50' and 52' in the recess, which sockets are electrically connected to the respective conductors. It will be seen that the central pin or prong 48 is arranged in alignment with the center line of the recess or mouth 40 so that the plug can only be inserted in a correct position without possibility of incorrect alignment. This is because the pin or plug 46, 46' will, through the electrically parallel relation secured by the junction at point 62, effect only this type of connection. One of the plugs 46 or 46' may be arranged so as to have no electrical significance, and it will be seen that the tapering sides and configuration of the plug in relation to the mouth interior will provide structure for ready and easy use in connecting the battery of one of the vehicles to supply energy to the battery of another.

Figure 2:
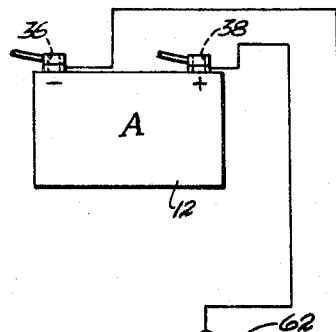
FIGURE 2 is an end view in elevation of the terminal socket as indicated by the arrowed lines 2 in FIGURE 1.
Figure 2:

Referring to the drawings of FIGURES 5–8, there is shown an electrical circuit in FIGURE 5 which includes an alternator 102 and a first battery circuit 104 including a battery 106 and a terminal receptacle 108 which includes a recessed mouth 110 of oval shape and tapered configuration to accommodate a plug of the type shown in FIGURE 2 on the end of an electrical cord such as that indicated by the numeral 16. In addition, the receptacle 108 is provided with an additional socket 112 to accommodate and utilize the alternating current generated by the alternator so that the vehicle engine may be utilized as a power plant to deliver electrical energy through the plug 114 for use in driving various appliances, such as electrical saws, electrical sanders for boats and the like, a suitable regulating instrument being provided in the electrical circuit so that delivered current and voltage to the plug 114 are in the range commonly utilized by such equipment. In this embodiment, the plug housing 120 includes the upper recess 110, a septum 122 and a lower socket 112 and the protective access door 124 which is normally in a closed position to protectively cover the interior of the housing. Suitable electrical conductors 126 and 128 interconnect the upper direct current socket of the battery and the lower alternating current socket with the output of the alternator.

It will be apparent that an automobile provided with the equipment illustrated in FIGURES 5–8 may be employed for starting a vehicle similarly equipped in the manner indicated above with respect to the description indicated in FIGURES 1–4, and that, in addition, the terminal or socket 108 may be utilized to deliver alternating current power to a variety of alternating current type appliances.

The preferred construction for the plugs 18 and 20 is as indicated in FIGURE 1 including a body portion 6 having a tapered terminal end 7 and a proximal end 8 with a neck 9 so as to configure the plug for grasping and inserting into the recess or mouth 40 of the receptacle unit. It will be apparent that this unit may be employed on an emergency basis in a poorly illuminated area and materially reduce the time, expense and effort involved in starting a car with a defective battery. Additionally, it will be apparent that the embodiment of FIGURES 5–8 will provide the added convenience and ability of utilizing the power plant of a vehicle for driving electrical appliances and will be of special significance, use and value to persons such as campers and those in the building trade. By reason of the above-described structure, the polarity of a system may be respected without the danger of a reversal thereof. The hood area of the receptacle unit walls about the receptacle mouth reduces any danger of sparks, flashes or shocks while the hinged cap protectively covers the housing to resist entrance of weather-driven elements and dust and the like. A length of connector wire in the order of about 8 to 12 feet is sufficient and preferably the wire is of a multiple strand, heavy gauge insulated cable. Suitable connector means may be provided to interconnect the receptacles to the battery or alternator for use in combination with existing equipment. This invention provides an improved electrical system of expanded use and convenience. It will be apparent that in a garage or the like having an electrical outlet, an electrical cord, which includes a transformer, may be used to start the engine of a vehicle equipped with this improvement.

While the instant invention has been shown and described herein in what is conceived to be the most practical and preferred embodiment, it is recognized that departures may be made therefrom within the scope of the invention, which is, therefore, not to be limited to the details disclosed herein but is to be accorded the full scope of the claims so as to embrace any and all equivalent apparatus and articles.

What is claimed is:

1. For use in electrically interconnecting a defective battery on a first vehicle and a charged battery on a second vehicle, an electrical system including:
    (a) a receptacle unit mounted on the first vehicle,
    (b) said unit including a configured entrance mouth receptacle and an electrical socket therein and conductor means electrically connecting the socket to its associated battery; and
    (c) a connector cord to electrically connect said receptacle to a similar receptacle mounted on said second vehicle, including
        (1) a male electrical plug at each end of the cord, configured so as to nest within the mouth of said unit, and
        (2) electrical pins to be received in the electrical socket, and
        (3) guide means to inter-engage in the receptacle mouth for guiding the pins into a predetermined position of electrical engagement in the socket for completing an electrical system to provide energy from the charged battery to supplement the energy of the defective battery.

2. The improvement as set forth in claim 1 wherein said receptacle unit includes a mouth configured with an inwardly uniformly tapered wall of a cross sectional area characterized by a major axis of a first length and a minor axis of a shorter length and the plugs are of common companionate configuration for nesting in the mouth of said receptacle.

3. The improvement as set forth in claim 2 wherein the socket means in the mouth of a receptacle unit includes a central socket of a first polarity and a pair of sockets equi-spaced, one on each side of the central socket of a second polarity, and the plug includes a central pin of the first polarity for nesting and electrical engagement in the central socket and a pair of male prongs, said prongs being equi-spaced on opposite sides of the central electrical pin to to interconnect in the sockets of the pair.

4. The improvement as set forth in claim 3 wherein the receptacle is provided with an additional socket means and circuit means interconnecting the additional socket means to the output of an alternator on the vehicle to accommodate the lead of alternating current appliances.

5. The improvement as set forth in claim 4 wherein septum means are provided to separate the additional socket means from said entrance mouth and the additional socket means are closely adjacent the entrance plane of the receptacle unit.

6. The improvement as set forth in claim 5 wherein said unit is provided with a spring biased, hingedly mounted, normally closed access cover to protectively close the entrance mouth.

7. The improvement as set forth in claim 1 wherein said unit is provided with a spring biased, hingedly mounted, normally closed access cover to protectively close the entrance mouth.

8. The improvement as set forth in claim 1 wherein alignment means are provided on the receptacle unit and in each of the plugs to limit electrical inter-engagement of the plugs and receptacle unit in respect of a predetermined electrical polarity.

References Cited

UNITED STATES PATENTS

| | | | |
|---|---|---|---|
| 1,950,428 | 3/1934 | Young | 320—6 |
| 3,189,212 | 6/1965 | Bellek | 339—44 X |
| 3,293,443 | 12/1966 | Burch. | |
| 3,343,057 | 9/1967 | Smith. | |

ROBERT K. SCHAEFER, Primary Examiner

T. B. JOIKE, Assistant Examiner

U.S. Cl. X.R.

320—25; 339—29, 44